United States Patent
Adolph et al.

(10) Patent No.: US 9,936,047 B2
(45) Date of Patent: *Apr. 3, 2018

(54) METHOD AND APPARATUS FOR PROVISIONING VIRTUAL NETWORK FUNCTIONS FROM A NETWORK SERVICE PROVIDER

(71) Applicant: Ciena Corporation, Hanover, MD (US)

(72) Inventors: Stephen Kieran Adolph, Ottawa (CA);
Michael Alain Gazier, Ottawa (CA);
Ian Hamish Duncan, Ottawa (CA);
James Andrew Frodsham, Ottawa (CA); Denis Fluet, Longueuil (CA)

(73) Assignee: Ciena Corporation, Hanover, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/361,956

(22) Filed: Nov. 28, 2016

(65) Prior Publication Data
US 2017/0078216 A1    Mar. 16, 2017

Related U.S. Application Data

(63) Continuation-in-part of application No. 14/056,628, filed on Oct. 17, 2013, now Pat. No. 9,509,626.

(51) Int. Cl.
*H04L 29/08* (2006.01)
*H04L 12/46* (2006.01)
(Continued)

(52) U.S. Cl.
CPC ............... *H04L 67/34* (2013.01); *G06F 8/63* (2013.01); *G06F 9/45558* (2013.01);
(Continued)

(58) Field of Classification Search
CPC ....... G06F 9/45558; G06F 2009/45579; G06F 9/45533; G06F 9/5077; G06F 2009/4557;
(Continued)

(56) References Cited

U.S. PATENT DOCUMENTS 8,218,445 B2   7/2012   Katz et al.
8,650,299 B1   2/2014   Huang et al.
(Continued)

OTHER PUBLICATIONS

Willis et al., Network functions Virtualisation, CIO Summit 2013, BT Technology, Service and Operations, pp. 1-12.
(Continued)

*Primary Examiner* — Chirag R Patel
(74) *Attorney, Agent, or Firm* — Clements Bernard Walker PLLC; Christopher L. Bernard; Lawrence A. Baratta, Jr.

(57) ABSTRACT

A method and apparatus facilitates an enterprise to lease virtual appliances from network services provider. The method operates by deploying a converged networking and computing device at a service location, downloading a virtual network function to the converged networking and computing device, activating the virtual network function by a service in the wide area network, and connecting the virtual network function to a provisioned network path over the wide area network. Different virtual network functions can be deployed to different locations. The same virtual network function scan be deployed to different locations. Moreover, more than one virtual network function may be deployed to more than one service location. The virtual network functions can be realized through virtual machines, software containers, etc.

20 Claims, 16 Drawing Sheets

(51) Int. Cl.
*G06F 9/445* (2018.01)
*G06F 9/455* (2018.01)
*H04L 12/24* (2006.01)
*H04W 4/12* (2009.01)
*H04W 4/18* (2009.01)
*H04W 92/02* (2009.01)

(52) U.S. Cl.
CPC ...... *H04L 12/4641* (2013.01); *H04L 41/0896* (2013.01); *H04L 41/5051* (2013.01); *H04L 67/10* (2013.01); *H04L 67/16* (2013.01); *G06F 2009/45562* (2013.01); *H04L 41/5096* (2013.01); *H04W 4/12* (2013.01); *H04W 4/18* (2013.01); *H04W 92/02* (2013.01)

(58) Field of Classification Search
CPC . H04L 45/22; H04L 67/1097; H04L 41/0893; H04L 67/10; H04L 67/16
See application file for complete search history.

(56) References Cited

U.S. PATENT DOCUMENTS

| | | | |
|---|---|---|---|
| 9,342,341 B2* | 5/2016 | Tsadok | G06F 9/45558 |
| 2012/0198442 A1* | 8/2012 | Kashyap | G06F 8/61 |
| | | | 718/1 |
| 2012/0207174 A1* | 8/2012 | Shieh | H04L 47/125 |
| | | | 370/401 |
| 2014/0068599 A1 | 3/2014 | Kannan et al. | |
| 2014/0229620 A1 | 8/2014 | Horman et al. | |
| 2015/0067168 A1* | 3/2015 | Hegdal | H04L 47/70 |
| | | | 709/226 |

OTHER PUBLICATIONS

Network Functions Virtualisation—Introductory White Paper Issue 1, An Introduction, Benefits, Enablers, Challenges and Call for Action, Oct. 22-24, 2012, pp. 1-16.

* cited by examiner

METHOD AND APPARATUS FOR PROVISIONING VIRTUAL NETWORK FUNCTIONS FROM A NETWORK SERVICE PROVIDER

CROSS-REFERENCE TO RELATED APPLICATION(S)

The present patent/application is a continuation-in-place of U.S. patent application Ser. No. 14/056,628 filed Oct. 17, 2013, and entitled "METHOD AND APPARATUS FOR PROVISIONING A VIRTUAL MACHINE (VM) FROM A NETWORK SERVICE PROVIDER," the contents of which are incorporated by reference.

FIELD OF THE DISCLOSURE

Aspects of the present disclosure relate generally to provisioning of computing and networking resources, and more particularly, to provisioning computing and networking resources to an enterprise and/or a consumer of network services. Additionally, aspects of the present disclosure relate generally distribution of virtual network functions (VNFs) executed through virtual machines, software containers, etc. using networks.

BACKGROUND OF THE DISCLOSURE

Many companies provide public and private cloud services. Such companies include Rackspace®, Google®, Amazon®, Microsoft Azure®, and the like. Enterprises such as financial institutions, banks, law firms, manufacturers, and the like may wish to lease datacenter resources from cloud providers. The cloud infrastructure providers allow the enterprises to run their computing equipment within the cloud infrastructure provider facility. This is commonly called a hosted data center solution.

In many cases, the hosted or cloud data center consists of virtualized compute, storage, and network resources. In order to create desired functionality in a virtualized environment, it is often required that software functionality be transferred, installed, managed, and operated in the form of a virtual machine (VM). Virtual machines are files that contain operating system, software, and data, and are the virtual equivalent of a physical compute resource implementing an application or function. Companies are increasingly using the virtual machine format as a way to commercialize their technology, and products embodied as virtual machines are essential large (typically one gigabyte or more) data files (content) that are licensed for use by an end user. Unfortunately, since these virtual machines can be quite large, the distribution of these files from producers to consumers can be difficult, time consuming, and expensive. Inability to rapidly distribute virtual machines also impairs the ability to consume or use the virtual machine, especially for short time duration uses.

Thus, improved apparatuses and methods for provisioning computing resources are desired.

BRIEF SUMMARY OF THE DISCLOSURE

Exemplary implementations of the invention are directed to a mechanism for provisioning one or more Virtual Network Functions (VNF) executed on virtual machines (VMs), software containers, or the like from a network service provider. The mechanism operates by deploying a converged networking and computing device at a service location, downloading a VNF to the converged networking and computing device, activating the VNF by a service in the wide area network, and connecting the VNF to a provisioned network path over the wide area network. Different VNFs can be deployed to different locations. The same VNF can be deployed to different locations. Moreover, more than one VNF may be deployed to more than one service location.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
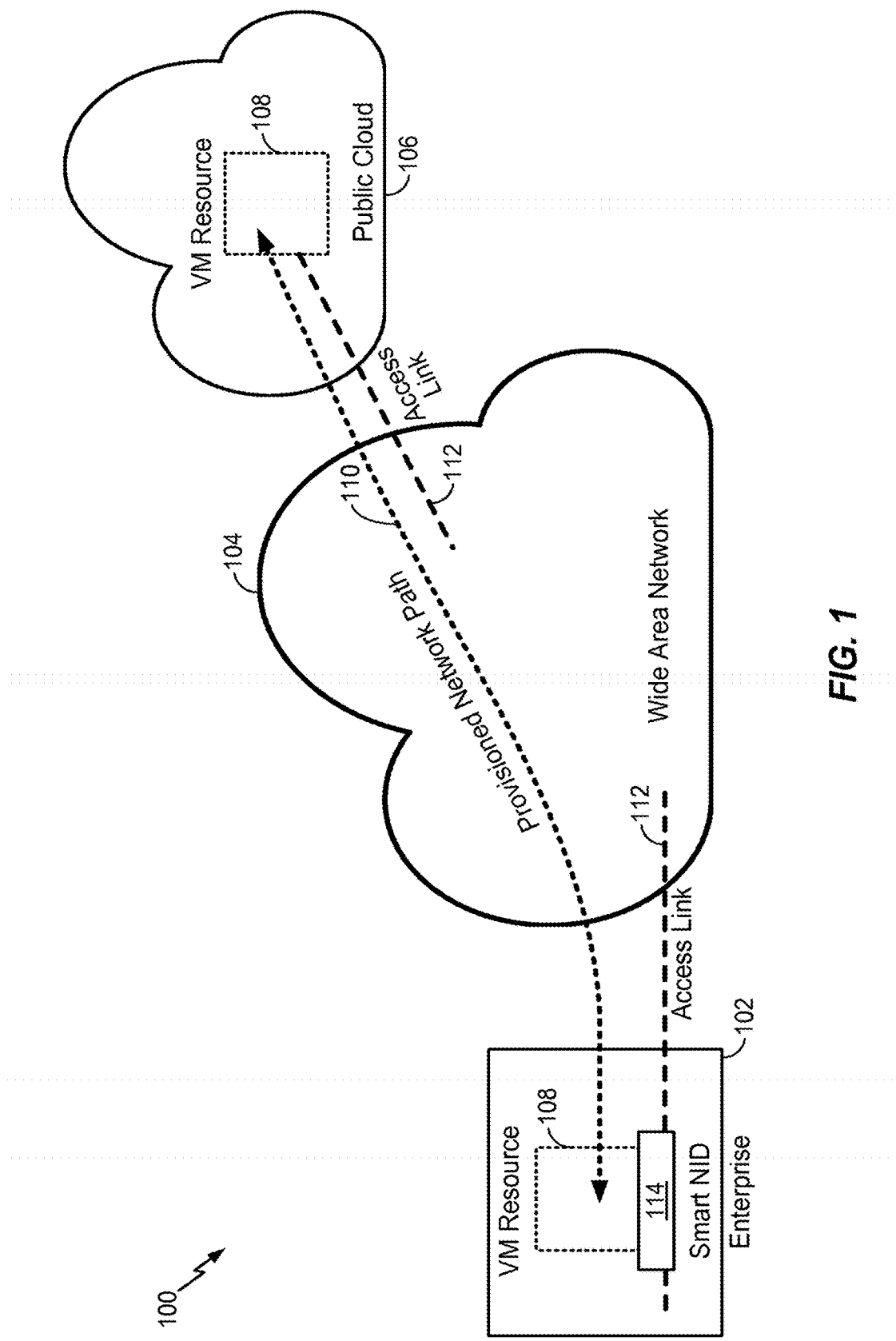
FIG. 1 illustrates an environment that is suitable for provisioning a VNF executed on a virtual machine (VM), software container, or the like from a network service provider according to at least one implementation.

Aspects of the invention are disclosed in the following description and related drawings directed to specific implementations of the invention. Alternative implementations may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any implementation described herein as "exemplary" is not necessarily to be construed as preferred or advantageous over other implementations. Likewise, the term "implementations of the invention" does not require that all implementations of the invention include the discussed feature, advantage, or mode of operation.

The terminology used herein is for the purpose of describing particular implementations only and is not intended to be limiting of implementations of the invention. As used herein, the singular forms "a," "an," and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

Further, many implementations are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the implementations described herein, the corresponding form of any such implementations may be described herein as, for example, "logic configured to" perform the described action.

Enterprises have commonly leased wide area network (WAN) bandwidth services (private lines) to enable interconnection of their data centers and corporate offices to address new computing, storage, and general information technology (IT) requirements. Enterprises purchase and deploy application-enabling equipment, software, and services in conjunction with these WAN services, and the total expense incurred to address the business requirement is amortized over the life of the solution (typically a few years).

The emergence of public and private cloud service providers, such Amazon and Rackspace, or internet content providers, such as video content, Google, Verizon® Terremark®, CenturyLink® Savvis®, AT&T®, etc., (termed herein "cloud service providers") has fundamentally changed the nature of wide area service requirements to enterprises. For example, service characteristics have changed, bandwidth demands are highly variable and often require very high speed service rates, low latency and low error rates, and connectivity end points are dynamic and follow the cloud service provider. In many cases, it is neither feasible nor acceptable to require several months of set up time in order to facilitate a one-time large data file transfer into a specific cloud service provider requiring only a few hours of dedicated service.

Public cloud service providers provide access to affordable large scale computing and storage resources by enterprises with the caveat that custom hardware solutions are not available on the cloud service providers' infrastructure. Any unique capabilities required by the enterprise to make use of the public cloud service providers' infrastructure tends to be delivered into the cloud as software in the form of a virtual network function that is compatible with a generic infrastructure. This limitation is forcing the transition from custom hardware/software based enterprise application equipment into software-only VNF-based products that are cloud-compatible. The VNFs can be implemented through a VM, software container, etc.

Virtual network functions have emerged as a convenient and effective means to deliver applications and functionality to end users. A virtual machine is the virtual equivalent of a physical machine, and comprises all the information needed to transform a generic compute resource into a specific function, including operating system, software, and data. A virtual machine is simply a large data file that is loaded onto a generic computer running a suitable hypervisor (like VMWare, KVM, XEN, or the like). Increasingly, companies that produce products for use in datacenters like load balancers, WAN optimizers, firewalls, security appliances etc., are transforming their products from physical to virtual, and producing virtual machines that embody their specific capabilities. Virtual machines can be very large files, typically at least a gigabyte and often times larger. As a result, virtual machines can be somewhat time consuming to obtain using typically available networking technologies due to the large file sizes.

In addition to virtual machines, virtual network functions can be implemented through software containers. Software containers contain an entire runtime environment, namely an application, plus all its dependencies, libraries and other binaries, and configuration files needed to run it, bundled into one package. By containerizing the application platform and its dependencies, differences in operating systems distributions and underlying infrastructure are abstracted away. Virtual machines, by contrast, include the same application along with an entire operating system. Thus, a physical server running three virtual machines would have a hypervisor and three separate operating systems running on top of it. On the contrary, software containers would us the same operating system on the physical server.

A virtual network function is responsible for handling specific network functions that run in one or more virtual machines or software containers on top of the hardware networking infrastructure, which can include routers, switches, servers, cloud computing systems and more. Individual virtualized network functions can be chained or combined together in a building block-style fashion to deliver full-scale networking communication services. The emergence of cloud datacenter providers, the virtualization of data center resources, and the increasing use of the virtual machine network function structure for implementation and delivery of technology to enterprises has created a need for a flexible, fast, and reliable mechanism for distribution of virtual network functions machines between producers of virtual network functions machines and consumers of virtual network functions.

Wide area network providers may use their high-speed network infrastructure to deliver one or more virtual machines or software containers realizing a virtual network function to one or more service locations, facilitating the use of the virtual machines or software containers in any location served by a wide area network. The wide area network provider may also deliver the virtual machine or software container in-band to further optimize the delivery of the virtual machine or software container, reducing the time required to transfer and activate the virtual machine or software container. The wide area provider may remotely configure for use and remotely control the virtual machine or software container, and may additionally configure network resource(s) to facilitate interconnection of the virtual machines or software containers, the wide area network, and local area networks. By combining a virtual machine or software container resource with networking equipment, particularly networking equipment used and deployed at or near customer premises, the wide area network provider may deploy virtual network functions in locations where it may be most advantageous for the operation of the virtual network functions. The wide area network provider may also reconfigure network connectivity in order to shorten the time required to distribute a virtual network functions, further benefiting the consumption of the virtual network functions. After the virtual machines or software containers have been transferred across the provisioned network resource, the network may be reconfigured to enable end user bandwidth use. The wide area network provider may optionally allow the control and configuration of the virtual network function by the end user. The wide area network provider may optionally partition the virtual network function resource for use in part by an end user and also in part by the wide area network provider, allowing virtual network functions to be installed, configured, and operated by each party. The wide area network provider may partition some or all of a virtual network function resource for use by a third party, allowing virtual network functions to be deployed, configured and used as part of a service offered by the third party.

One or more wide area network providers may jointly provide network resources and/or virtual network function resources in order to enable connectivity and/or access to virtual network function resources in service locations not reachable by a single wide area service provider.

Wide area network providers may also deploy, configure and control virtual network functions deployed in cloud infrastructures provided they are able to access the virtual network function resource.

Service points where virtual network function resources are available may be anywhere reachable by the wide area network provider, and include end user locations such as data centers, corporate head offices, regional and remote offices, public and private cloud data centers, and wide area network locations such as central offices, aggregation points, and utility closets in multi-tenant buildings.

In one or more implementations, the wide area service provider may utilize high-speed Ethernet technology to access service locations for the deployment of virtual network functions, typically based on Gigabit Ethernet or 10 Gigabit Ethernet. However, other types of network technology may be used provided the distribution of virtual network functions occurs in an acceptable time frame for the end user of the wide area service.

Provisioning of computing resources according to one or more aspects utilizes high bandwidth, low latency, low packet error rate, and on-demand data networking services to enterprises, permitting enterprises to obtain and deploy virtual machines in compute facilities rapidly and on demand. In other aspects, the network operator may deploy compute resources as hosts for virtual network functions whereby the network operator may provide access to the virtual network function to the end user. In some circumstances, an optimized network/computing device may be deployed in or in close proximity to the premises of the end user such that capabilities embodied in virtual machines may be deployed more directly located in proximity to the end user. Such a configuration may offer advantages in contrast to virtual network functions deployed in a remote location.

FIG. 1 illustrates an environment that 100 is suitable for implementing a mechanism for provisioning a virtual machine (VM) from a network service provider according to at least one implementation. In one or more implementations, the environment 100 includes networking capabilities such as the ability to assign/lease network resources on an on-demand basis. Again, the VM is utilized to implement or realizes a virtual network function. Also, a software container or equivalent could be used in place of the VM.

As used herein, "network resources" and/or "computing resources" can be services such as archive services, backup services, cloud security services, bandwidth, storage, encryption services, WAN optimization, dynamic performance on-demand services, availability services, data move services, data cache services, and the like. The environment 100 also is suitable for deploying applications in the form of virtual network functions into a public cloud or a private cloud on demand. In one or more implementations, the environment 100 uses a network service provider to distribute virtual network functions to enterprises.

The illustrated environment 100 includes an enterprise 102. In one or more implementations, the enterprise 102 may be one or more financial institutions, banks, law firms, manufacturers, and the like. The illustrated enterprise 102 may be any enterprise location where wide area network services terminate. For example, the illustrated enterprise 102 may be a data center, which may be a hosted or cloud data center that includes virtualized compute, storage, and network resources.

The illustrated environment 100 includes a wide area network 104. The illustrated wide area network 104 can be operated by one or more organizations (service providers) that provide connectivity to a person or another organization, using wired or wireless connections. Suitable organizations include, for example, commercial, community-owned, non-profit, or otherwise privately owned network service providers, a virtual private network (VPN), a regional wireless area network, a metropolitan wireless area network, or the like. In one or more implementations, a network service provider is a public network service provider that provides wide area connectivity using high speed Gigabit Ethernet technology (e.g., AT&T®) or a network service provider that provides broadband network connectivity via cable modem (e.g., Comcast®.)

The illustrated environment 100 includes a public cloud facility 106. Examples of public cloud facilities include Citrix®, Amazon Web Services®, Microsoft® Azure®, Google Drive®, Rackspace®, VMWare®, and the like.

The illustrated public cloud facility 106, as well as the enterprise 102, includes the virtual machine (VM) resource 108. In one or more implementations, the virtual machine resource 108 is a pool of compute, storage, and network capabilities. The virtual machine resource 108 may have the ability to deploy functionality in the form of virtual machines or software containers. Virtual network function resources suitable for implementing the VM resource 108 include load balancers, WAN optimizers, firewalls, security appliances, and the like.

The illustrated environment 100 includes a provisioned network path 110, which is a data connection provided by a service provider in the wide area network 104 between enterprise 102 and the public cloud facility 106. The network service provider provides high-speed networking technologies to enable access to connections from the enterprise 102 to the wide area network 104 infrastructure. Similarly the network service provider provides high-speed networking technologies to enable access to connections from the enterprise 102 to the public cloud facility 106. In one or more implementations, the enterprise 102 may lease resources from a service provider in the wide area network 104 as well as a service provider in the public cloud facility 106. Such resources may include VM resource 108 (again, the VM resource 108 could also be a software container or equivalent).

The illustrated environment 100 includes an access link 112, which may implement high-speed Ethernet technology to access service locations for the deployment of virtual machines, typically based on Gigabit Ethernet or 10 Gigabit Ethernet. However, other types of network technology may be used to implement the access link 112 provided the distribution of virtual machines or software containers for a virtual network function occurs in an acceptable time frame for the end user of the wide area service.

The illustrated environment 100 includes a smart network interface device (NID) 114 that is associated with the VM resource 108. The smart NID 114 may be any suitable carrier Ethernet networking device that is capable of hosting virtual machines, such as an Ethernet customer premise device.

Figure 2:
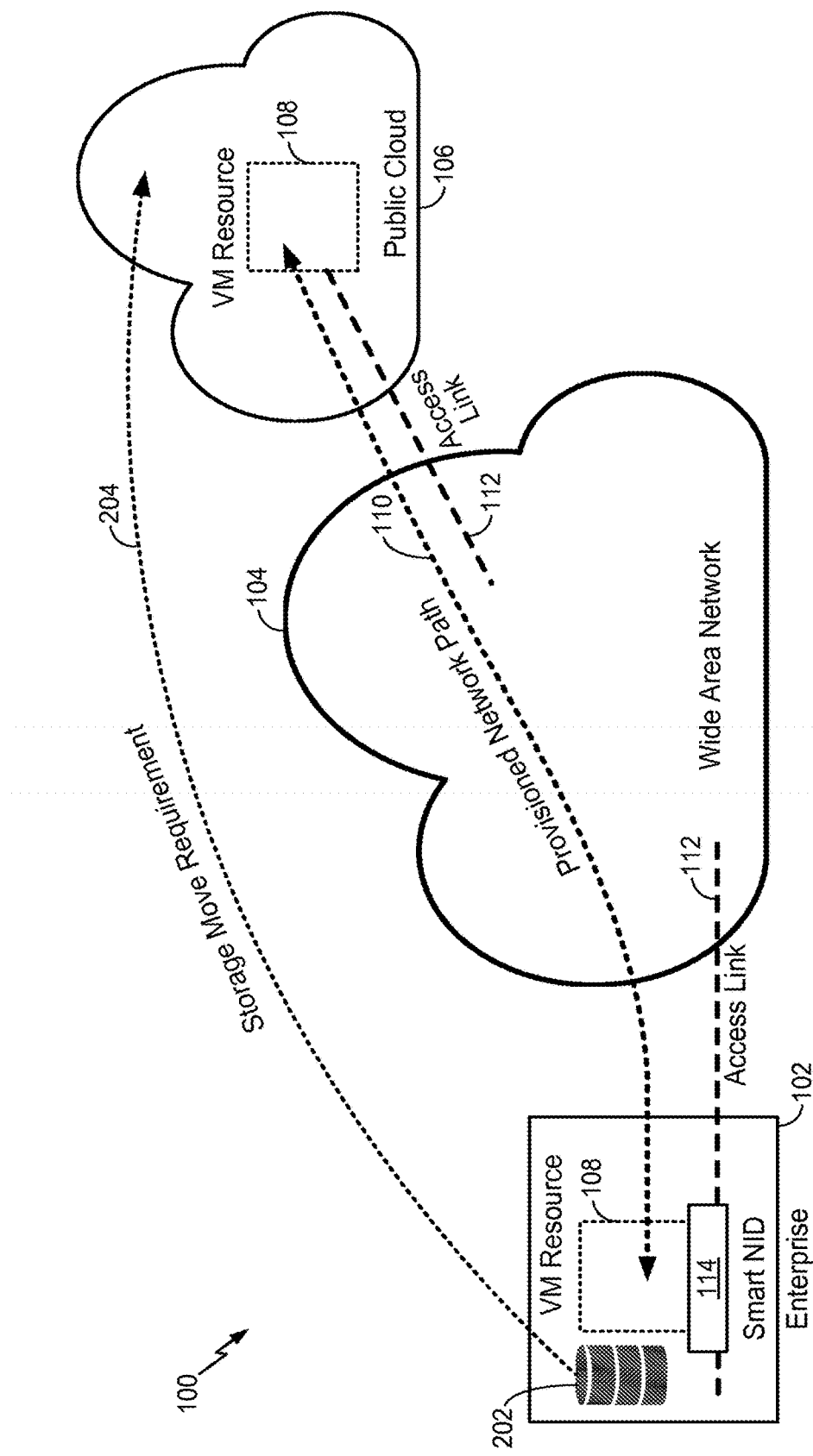
FIG. 2 illustrates a configuration of the environment depicted in FIG. 1 when an enterprise wishes to transfer a large storage volume from a local data center to a remote public cloud facility according to at least one implementation.

FIG. 2 illustrates a configuration of the environment 100 in which the enterprise 102 is to transfer a large storage volume from a local storage 202 to the public cloud facility 106 according to at least one implementation. In order to accomplish the transfer of the large storage volume from the storage 202 to the remote public cloud facility 106, the virtual machine resource 108 may be a WAN optimization networking appliance located at both the enterprise 102 and the public cloud facility 106. In the illustrated implementation, the desired transfer of the large storage volume from the storage 202 to the remote public cloud facility 106 is depicted by dotted arrow 204. The storage 202 is described in more detail below with reference to FIG. 3.

Figure 3:
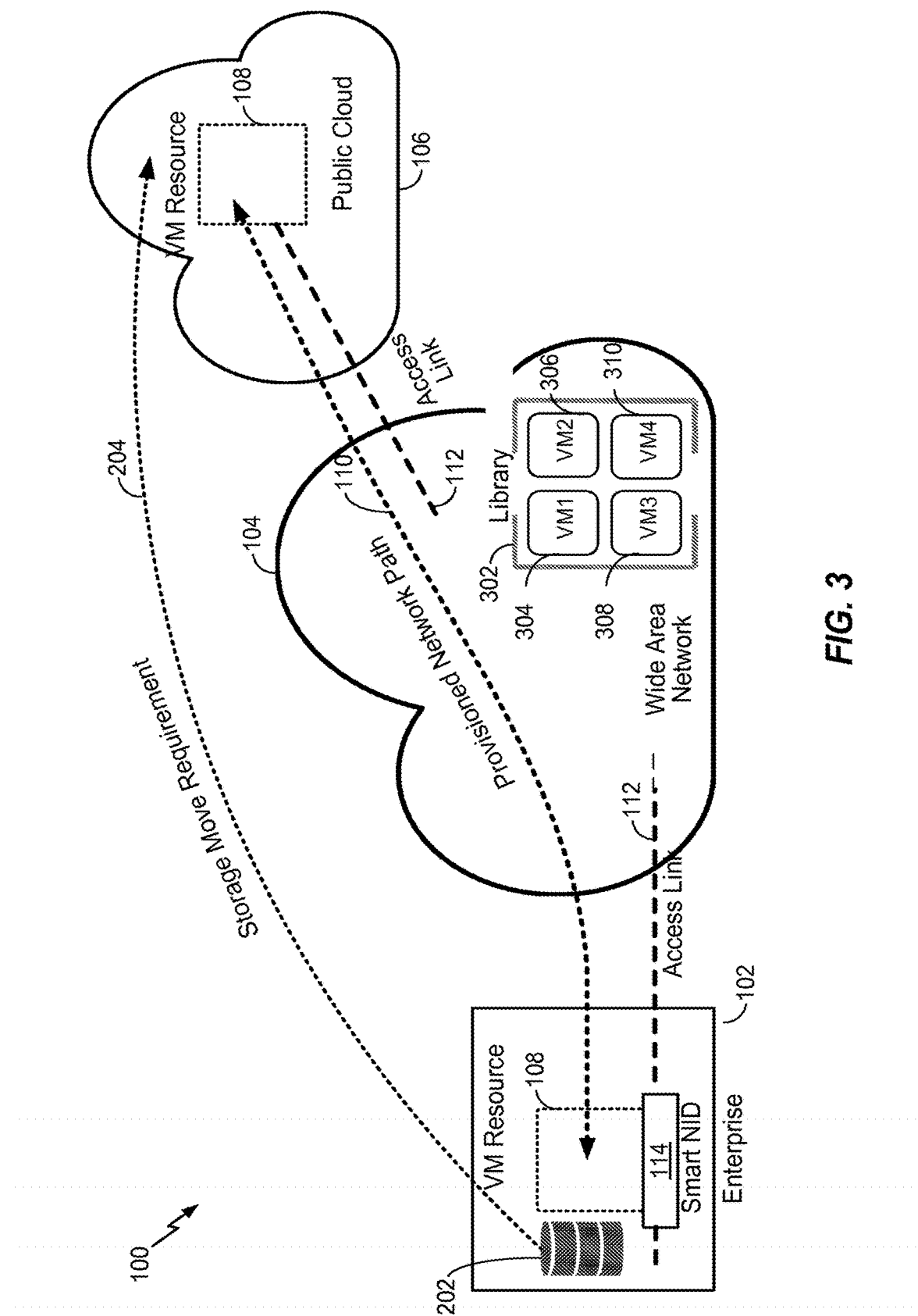
FIG. 3 illustrates a configuration of the environment depicted in FIG. 1 when an enterprise and/or network service provider identifies a suitable virtual machine according to at least one implementation.

FIG. 3 illustrates a configuration of the environment 100 when the enterprise 102, network service provider in the wide area network 104 and/or the public cloud facility 106 identifies a suitable virtual network function according to at least one implementation. The environment 100 illustrated in FIG. 3 includes a library 302, which may be configured to store multiple inactive virtual machine images that have been prepared for distribution. For example, the illustrated library 302 includes four virtual machines VM1 304, VM2 306, VM3, 308, and VM4 310. At least one of the four virtual machines VM1 304, VM2 306, VM3, 308, and VM4 310 is a WAN optimization networking appliance needed for deployment to the enterprise 102 in virtual machine resource 108. Although illustrated as including only four virtual machines VM1 304, VM2 306, VM3, 308, and VM4 310, the library 302 typically can include hundreds, thousands, etc., of virtual machines. Also, the library 302 can include software containers in addition to the VMs or in place of the VMs.

In one or more implementations, the environment 100 depicted in FIG. 3 is configured to execute the desired transfer of the large storage volume from the storage 202 to the remote public cloud facility 106. For purposes of explanation, assume that the VM3 308 is a WAN optimization virtual network function. VM2 306 also may be a WAN optimization virtual network function.

Figure 4:
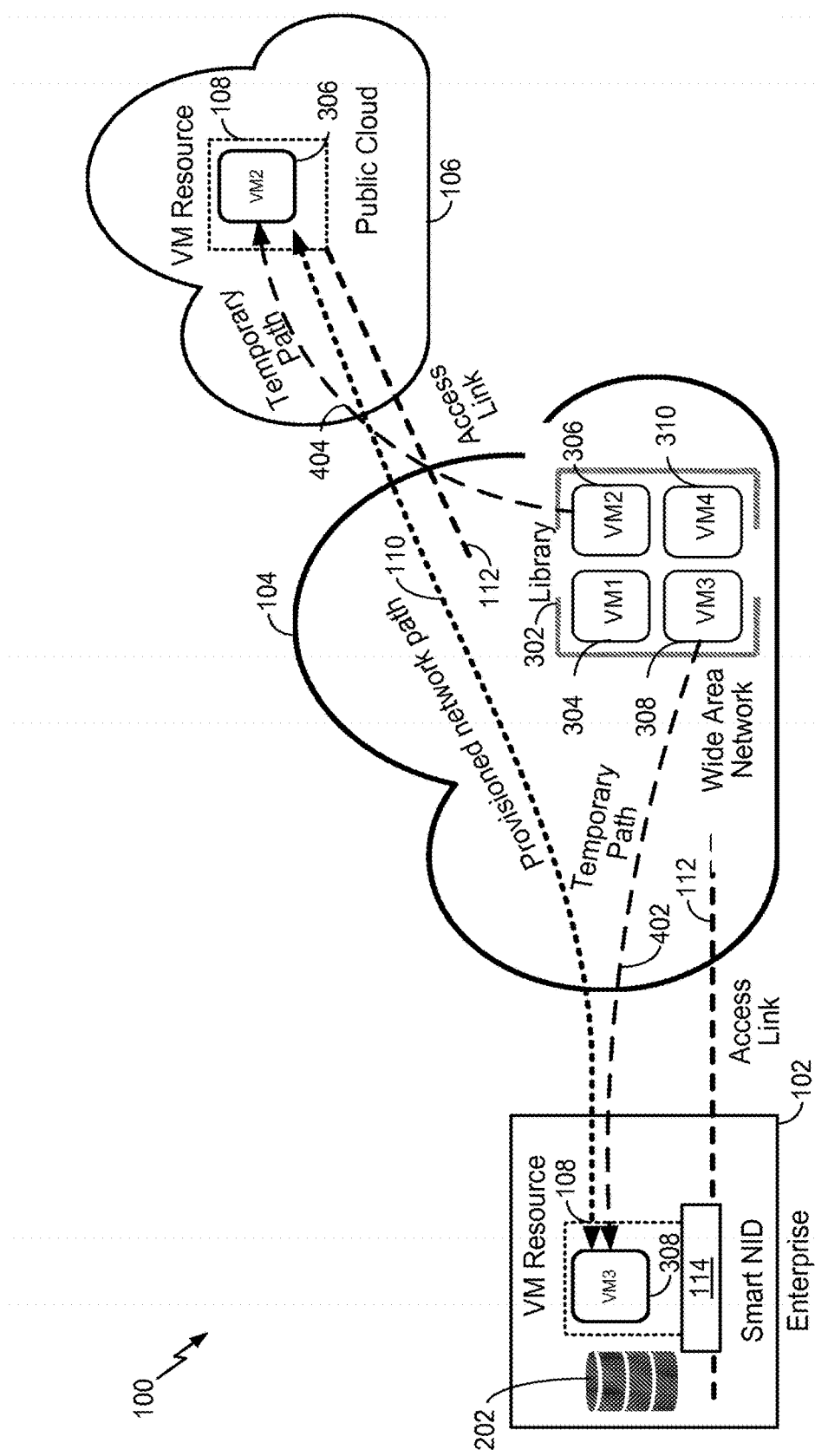
FIG. 4 illustrates a configuration of the environment depicted in FIG. 1 when a network service provider reconfigures network connectivity to enable high speed transfer of two different virtual machines from a central library to two different end point locations according to at least one implementation.

FIG. 4 illustrates a configuration of the environment 100 when a network service provider in the wide area network 104 reconfigures network connectivity to enable high speed transfer of two different virtual network functions from the storage 302 to desired end point locations (enterprise 102 and public cloud facility 106) using temporary network paths 402 and 404, respectively, according to at least one implementation. It will be understood that a virtual network function resource may host any number of virtual network function simultaneously as is supported by the available compute capability.

In this illustration VM3 308 has been selected for use by the end user, to be deployed and activated in the virtual machine resource 108 deployed at the enterprise 102. Similarly, VM2 306 has been selected for deployment and activation by the end user, to be deployed in the virtual machine resource 108 in the public cloud 106. Additional virtual network functions selections could be made, and additional virtual network functions could be deployed in those locations at the discretion of the end user depending on overall requirements. The service provider provisions the temporary paths 402 and 404 to facilitate transfer of the virtual machine images in an acceptable time frame, and then the temporary paths 402 and 404 may be removed or de-provisioned. Note, the temporary paths 402 and 404 have a different end point, namely the library 302 than the provisioned network path 110.

In the illustrated implementation, the network service provider in the wide area network 106 reconfigures the network connectivity (original provisioned network path 110) to enable high speed transfer of the VM3 308 from the library 302 to the enterprise 102. The network service provider in the wide area network 106 also reconfigures the network connectivity (original provisioned network path 110) to enable high speed transfer of the VM3 308 from the library 302 to the public cloud facility 106.

For example, instead of transferring VM3 308 from the network service provider in the wide area network 104 to the enterprise 102 and VM2 306 from the network service provider in the wide area network 104 to the public cloud facility 106 via the normal provisioned network path 110, the network service provider in the wide area network 104 transfers VM3 308 from the network service provider in the wide area network 104 to the enterprise 102 and VM2 306 from the network service provider in the wide area network 104 to the public cloud facility 106 via temporary path 402 and temporary path 404, respectively. Once VM3 308 and VM2 306 are transferred, activated, and configured by network service provider in the wide area network 104, the network connectivity is returned to its normal configuration in which the normal provisioning path is the provisioned network path 110.

Figure 5:
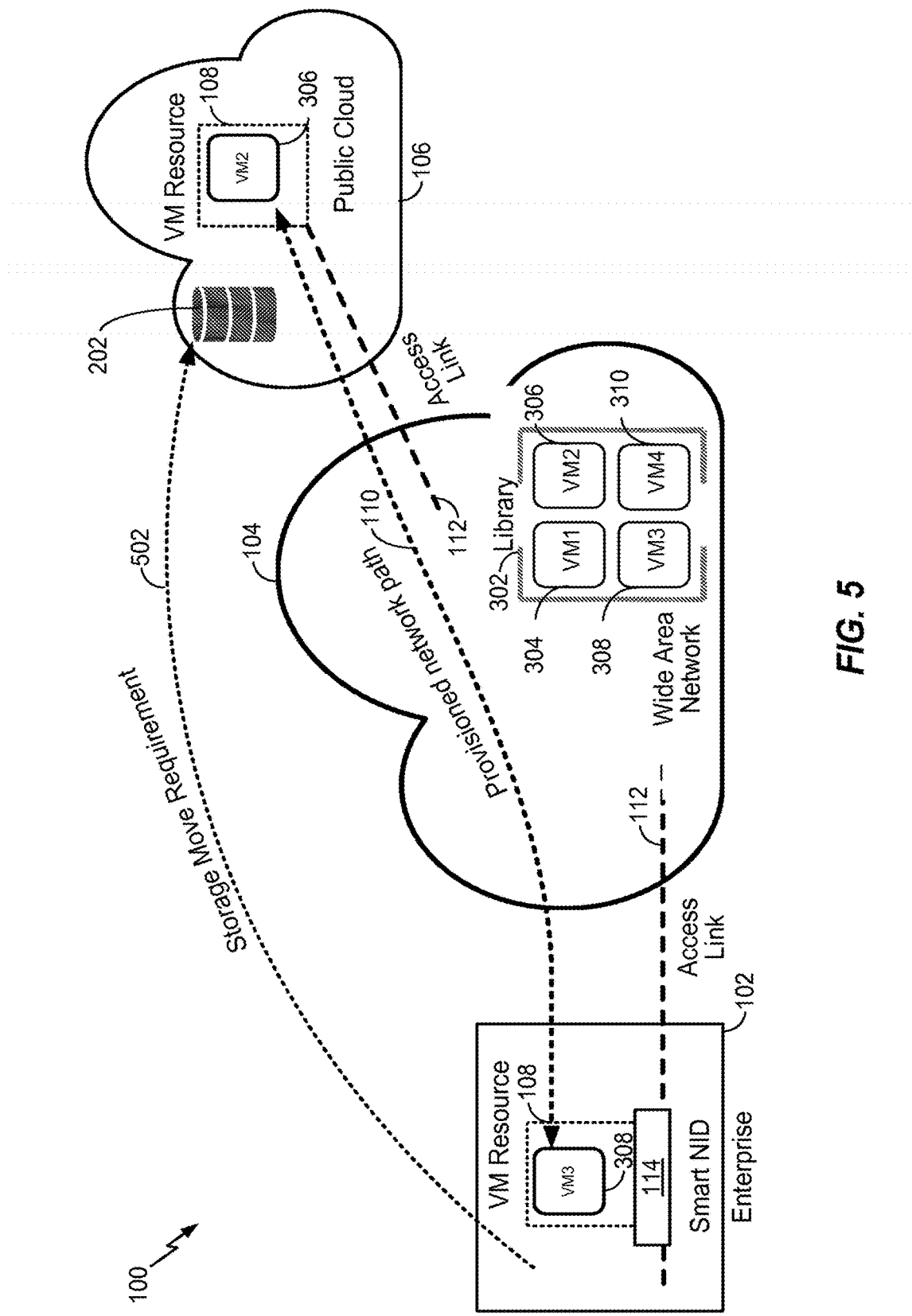
FIG. 5 illustrates a configuration of the environment depicted in FIG. 1 when transferring a large storage volume from storage in an enterprise data center to a remote public cloud facility according to at least one implementation.

FIG. 5 illustrates a configuration of the environment 100 when transferring a large storage volume from storage 202 in the enterprise 102 to remote public cloud facility 106 according to at least one implementation. FIG. 5 shows that the storage 202 is now located at the public cloud storage facility 106. FIG. 5 also shows that the network service provider in the wide area network 104 has released the temporary paths 402 and 404, and only the normal provisioned network path 110 is available. At this point the WAN optimization virtual network functions VM3 308 and VM2 306 can be deactivated and the enterprise 102 can be billed for the uses of the WAN optimization virtual network functions VM3 308 and VM2 306.

Figure 6:
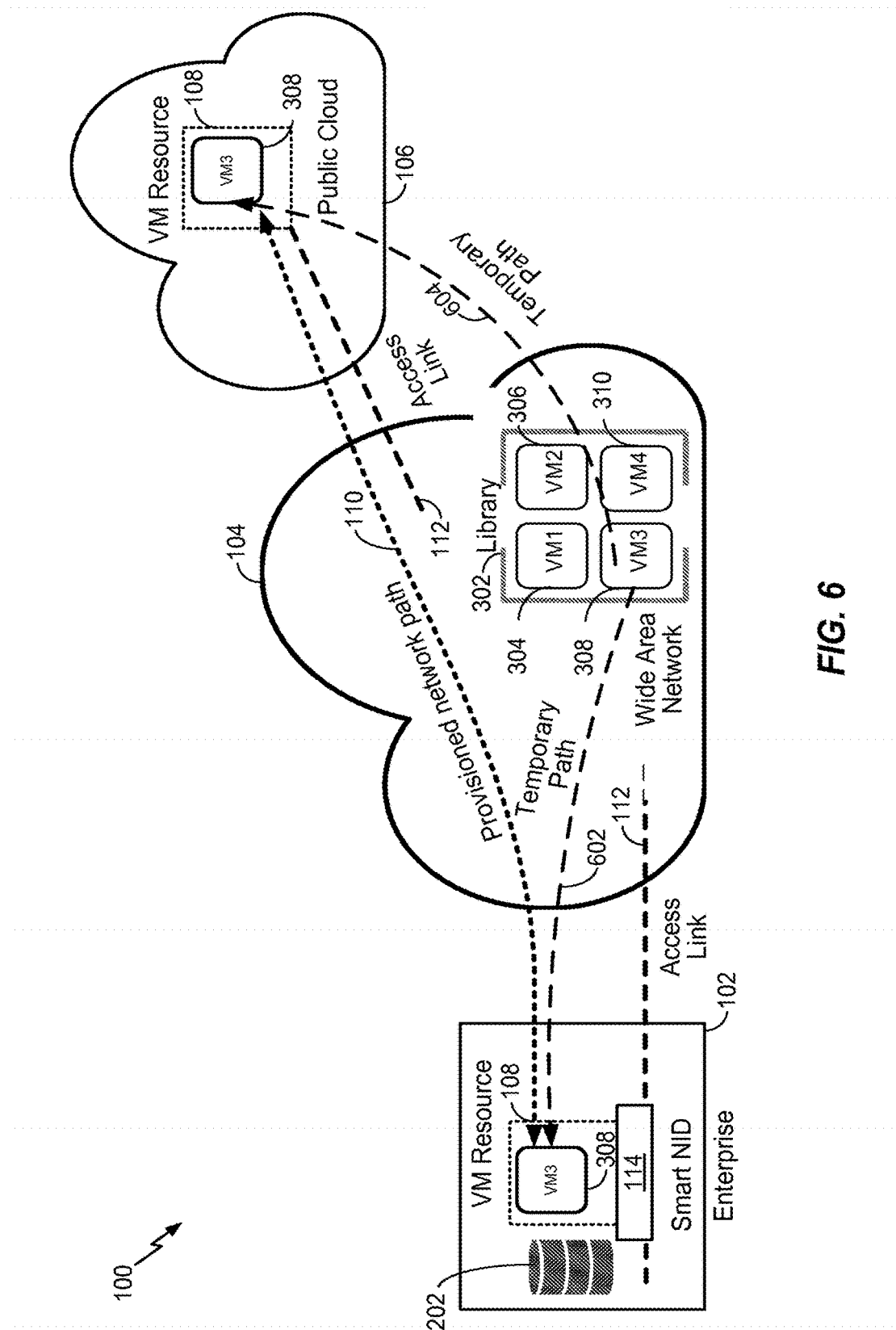
FIG. 6 illustrates a configuration of the environment depicted in FIG. 1 when a network service provider reconfigures network connectivity to enable high speed transfer of the same virtual machines from a central library to two different end point locations according to at least one implementation.

FIG. 6 illustrates a configuration of the environment 100 when a network service provider in the wide area network 104 reconfigures network connectivity to enable high speed transfer of the same virtual machine or software container (VM3 308) from the library 302 to desired end point locations (enterprise 102 and public cloud facility 106) using temporary network paths 602 and 604, respectively, according to at least one implementation. FIG. 6 illustrates a configuration of the environment 100 when transferring a large storage volume from storage 202 in the enterprise 102 to remote public cloud facility 106 according to at least one implementation.

In the implementation shown in FIG. 6, the network service provider in the wide area network 104 can later release the temporary paths 602 and 604 when VM3 308 is deactivated (i.e., after the storage 202 has been transferred) so that only the normal provisioned network path 110 is available. At this point the WAN optimization virtual network function VM3 308 the enterprise 102 can be billed for the uses of the WAN optimization virtual network function VM3 308.

Figure 7:
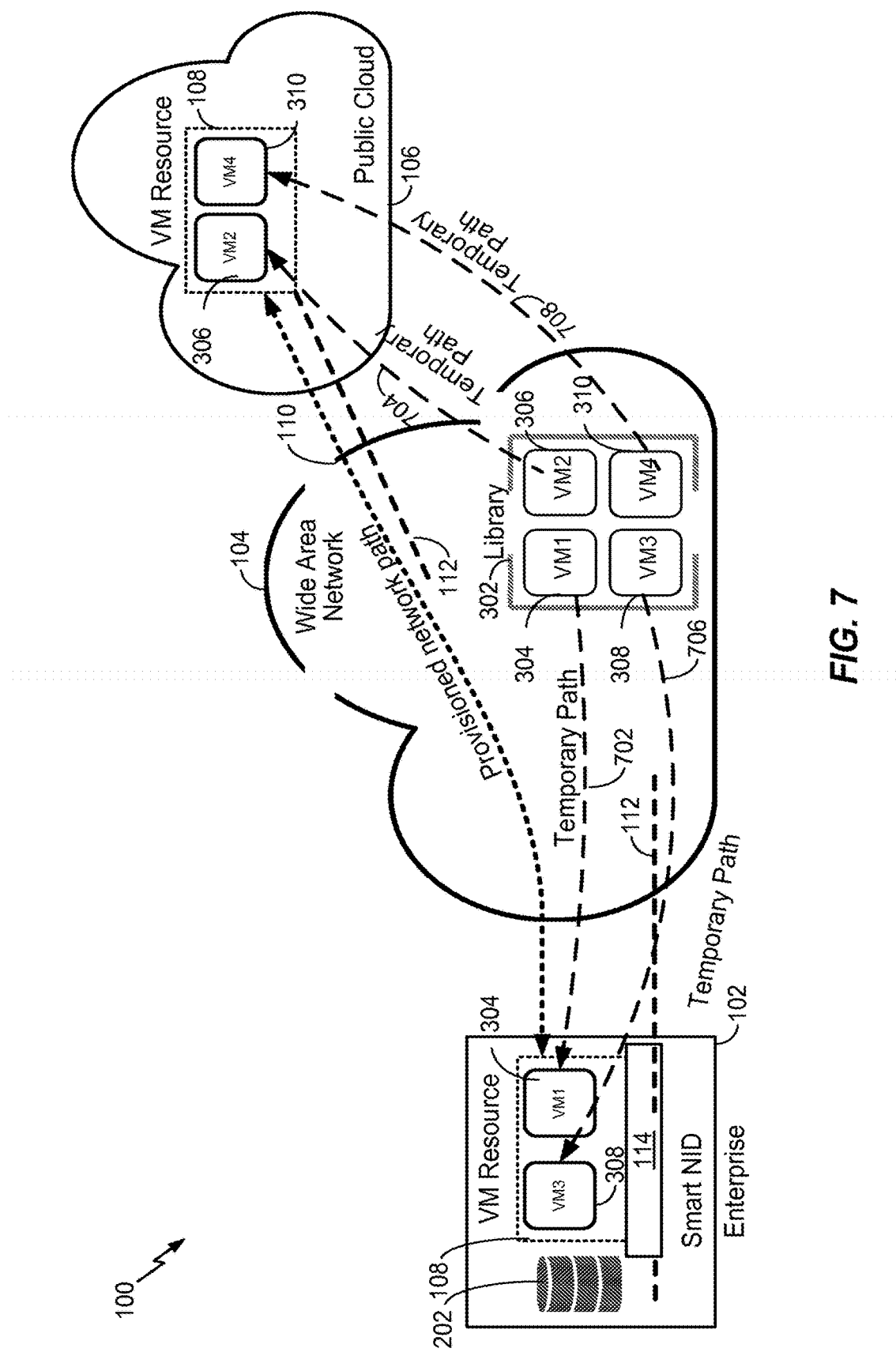
FIG. 7 illustrates a configuration of the environment depicted in FIG. 1 when a network service provider reconfigures network connectivity to enable high speed transfer of the two different virtual machines from a central library to one endpoint location and two different virtual machines to another end point location according to at least one implementation.

FIG. 7 illustrates a configuration of the environment 100 when a network service provider in the wide area network 104 reconfigures network connectivity to enable high speed transfer of the two different virtual network functions (VM1 304 and VM3 308) from the library 302 to one desired end point location (enterprise 102) and two different virtual network functions VM2 306 and VM4 310) from the library 302 to another desired end point location (public cloud facility 106) using temporary network paths 702, 706, 704, and 708, respectively, according to at least one implementation. FIG. 6 illustrates a configuration of the environment 100 when transferring a large storage volume from storage 202 in the enterprise 102 to remote public cloud facility 106 according to at least one implementation.

In the implementation shown in FIG. 7, the network service provider in the wide area network 104 can later release the temporary paths 602 and 604 when VM3 308 is deactivated (i.e., after the storage 202 has been transferred) so that only the normal provisioned network path 110 is available. At this point the WAN optimization virtual network function VM3 308 the enterprise 102 can be billed for the uses of the WAN optimization virtual network function VM3 308.

Figure 8:
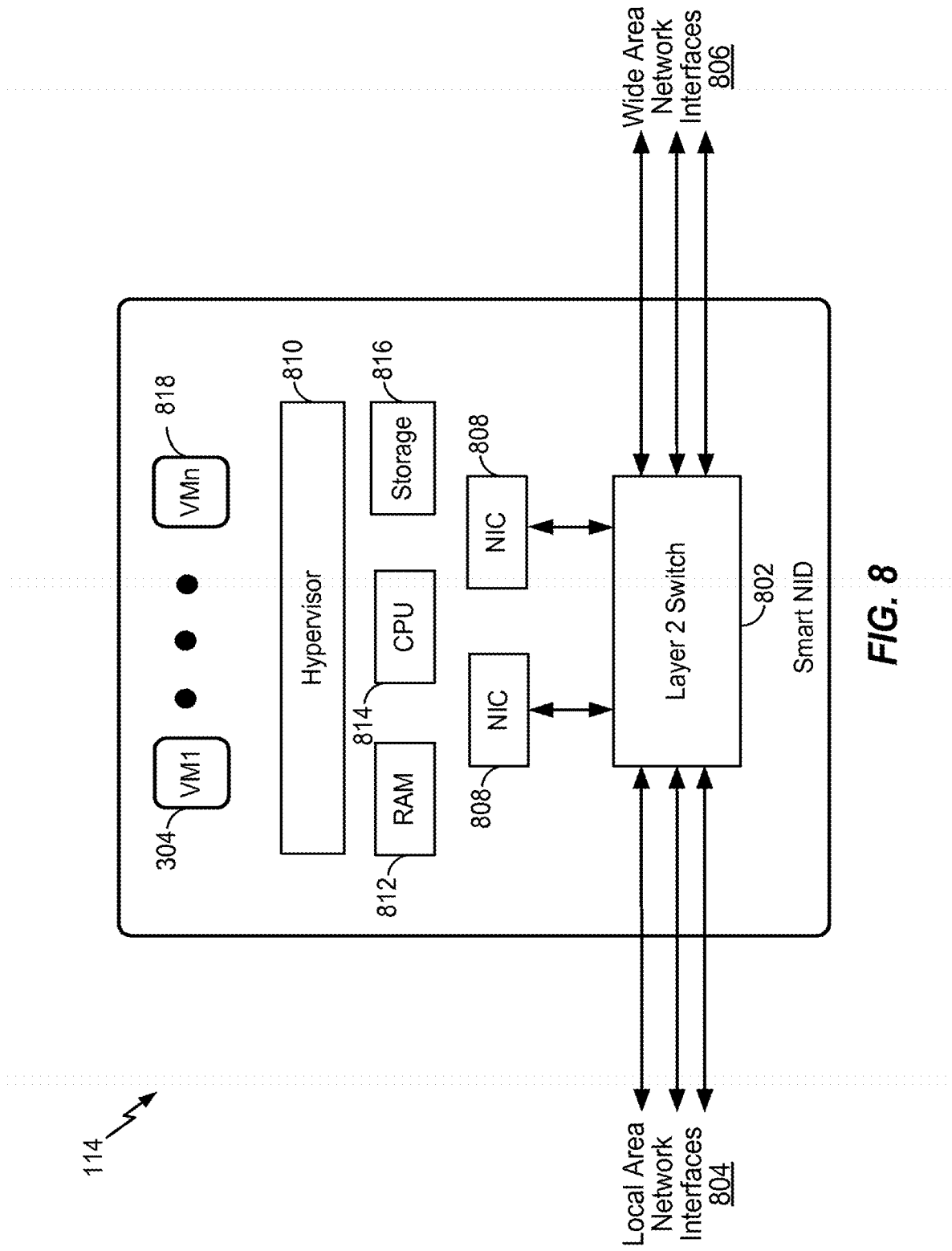
FIG. 8 illustrates a block diagram of the smart network interface device (smart NID) depicted in FIG. 1 according to at least one implementation.

FIG. 8 illustrates an example of a combined networking and computing device that may be used by a service provider to provide both network services and virtual network function appliance services. In the illustrated implementation, the combined networking and computing device is the Smart NID 114, which includes a Layer 2 switch 802, communications with local area network (LAN) interfaces 804, wide area network (WAN) interfaces 806, two network interface cards (NICs 808), a hypervisor 810, random access memory (RAM) 812, a central processing unit (CPU) 814, storage 816, and several virtual machines (VM1 308 through VMn 818) that are associated with the smart NID 114.

In one or more implementations, the smart NID 114 is the combination of a layer 2 Ethernet services NID and a compute complex typically consisting of an Ethernet switching device for creating and managing the connectivity between a local area network and a wide area network, and an integrated x86 based server which provides the resource necessary for hosting virtual machines or software containers. The switching capacity, number of switch ports, and server capacity may all vary depending on the service requirements. Generally network traffic that requires redirection to the virtual machine or software container for processing is connected to the server through physical network connections between the packet switching device and one or more Network Interface Card (NIC) 808 associated with the server. Packet traffic is then forwarded internally in the server to the virtual machine or software container. In some cases, the server complex may include packet processing hardware to accelerate the performance of the server and associated virtual machines or software containers.

Figure 9:
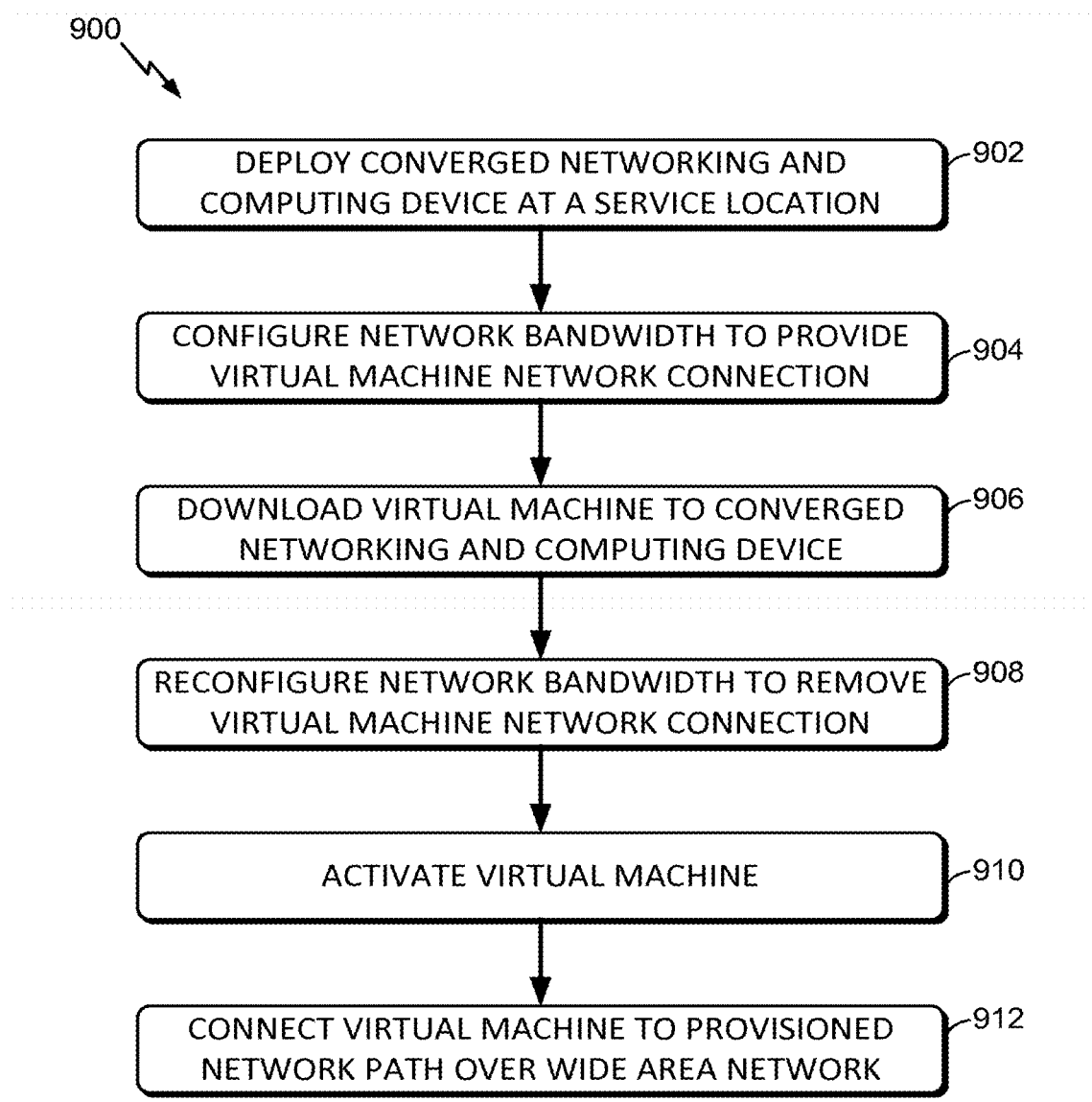
FIG. 9 illustrates a flowchart of how the environment depicted in FIG. 1 operates according to one or more implementations described herein.

FIG. 9 is a flowchart of a method 900 illustrating how the environment 100 operates according to one or more implementations described herein. In a block 902, the method 900 deploys a converged networking and computing device at a service location. In a block 904, the method 900 configures network bandwidth to provide a virtual machine or software container network connection. In a block 906, the method 900 downloads a virtual machine or software container to the converged networking and computing device. In a block 908, the method 900 reconfigures network bandwidth to remove the virtual machine or software container network connection. In a block 910, the method 900 activates the virtual machine or software container. In a block 912, the method 900 connects the virtual machine or software container to a provisioned network path over a wide area network.

Figure 10:
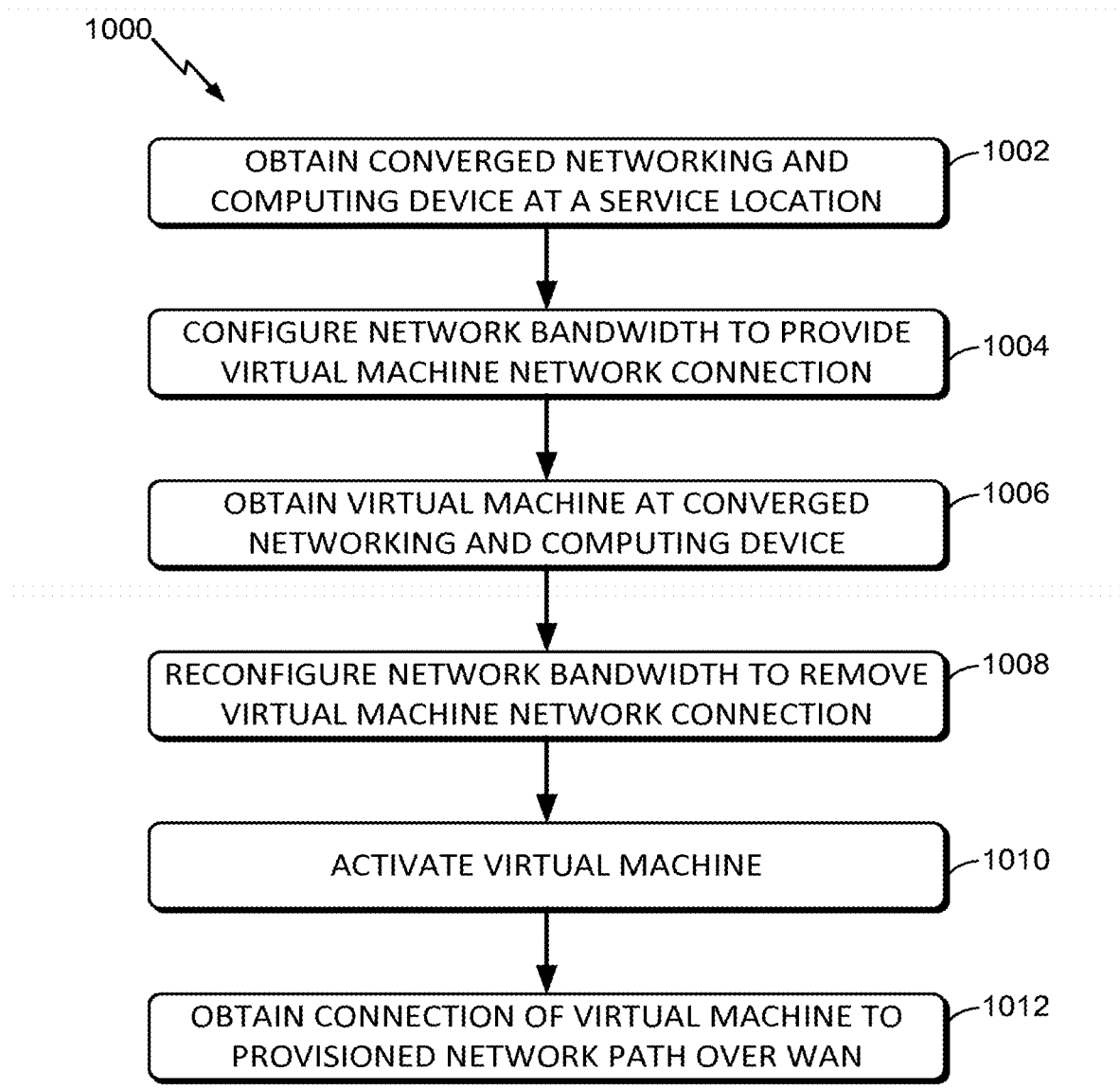
FIG. 10 illustrates a flowchart of how the environment depicted in FIG. 1 operates according to one or more alternative implementations described herein.

FIG. 10 is a flowchart of a method 1000 illustrating how the environment depicted in 100 operates according to one or more alternative implementations described herein. In a block 1002, the method 1002 obtains a converged networking and computing device at a service location. In a block 1004, the method 1000 configures network bandwidth to provide a virtual machine or software container network connection. In a block 1006, the method 1000 obtains a virtual machine or software container at the converged networking and computing device. In a block 1008, the method 1000 reconfigures network bandwidth to remove the virtual machine or software container network connection. In a block 1010, the method 1000 activates the virtual machine or software container. In a block 1012, the method 1000 obtains a connection to the virtual machine or software container to a provisioned network path over a wide area network.

Figure 11:
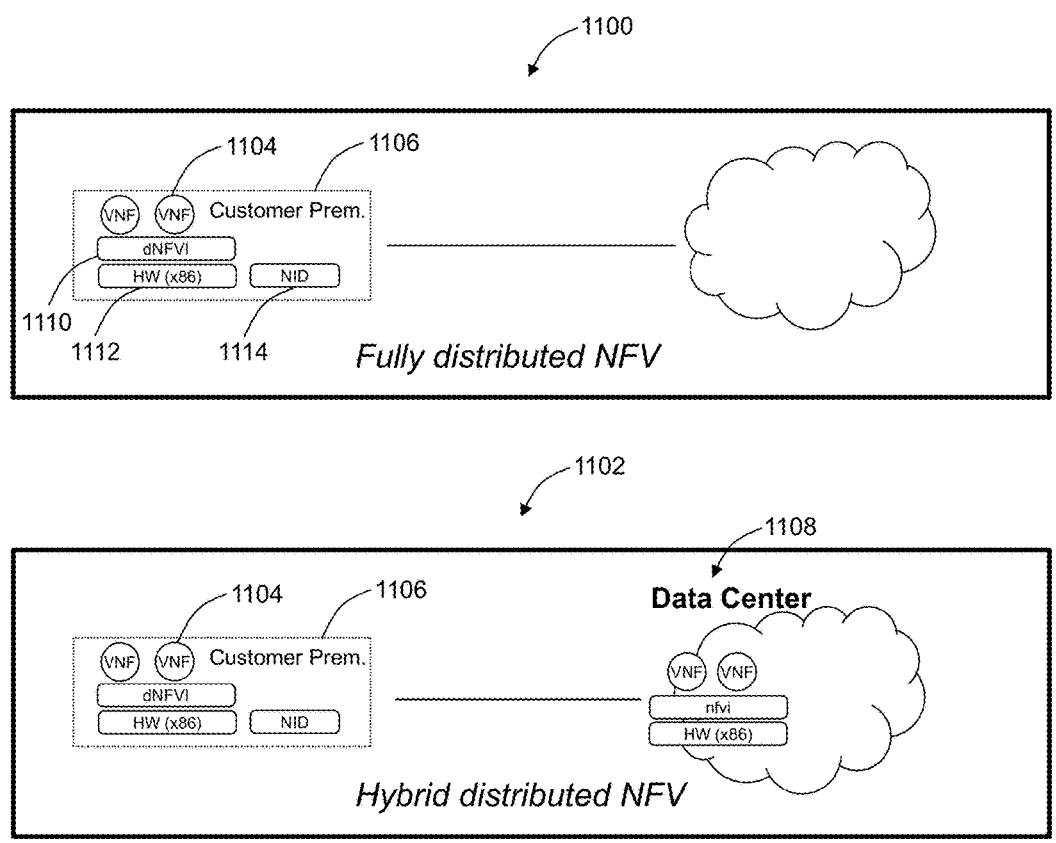
FIG. 11 illustrates a block diagram of exemplary implementations of distributed Network Functions Virtualization (NFV).

FIG. 11 is a block diagram of exemplary implementations of distributed Network Functions Virtualization (NFV) 1100, 1102. With the various systems and methods described herein, VNFs 1104 are expected to be distributed throughout the network, including at customer premises 1106. In a fully distributed NFV 1110 environment, the VNFs 1104 are located external from a data center 1108 whereas in a hybrid distributed NFV 1102 environment, the VNFs 1104 can be both at the customer premises 1106 and the data center 1108.

In particular, the deployment techniques described herein for VNFs advantageously support the distributed NFV 1100, 1102 environments.

In FIG. 11, the VNFs 1104 are shown logically with a distributed Network Functions Virtualization Infrastructure (dNFVI) 1110, associated compute hardware 1112 (such as, but not limited to, x86 devices), and a Network Interface Device (NID) 1114. NFV defines standards for compute, storage, and networking resources that can be used to build VNFs. The NFV Infrastructure (NFVI) is a key component of the NFV architecture that describes the hardware and software components on which virtual networks are built. The systems and methods described herein provide efficiency in VNF distribution. The hardware 1112 and the NID 1114 represent physical hardware for realizing the compute, storage, and networking resources.

Figure 12:
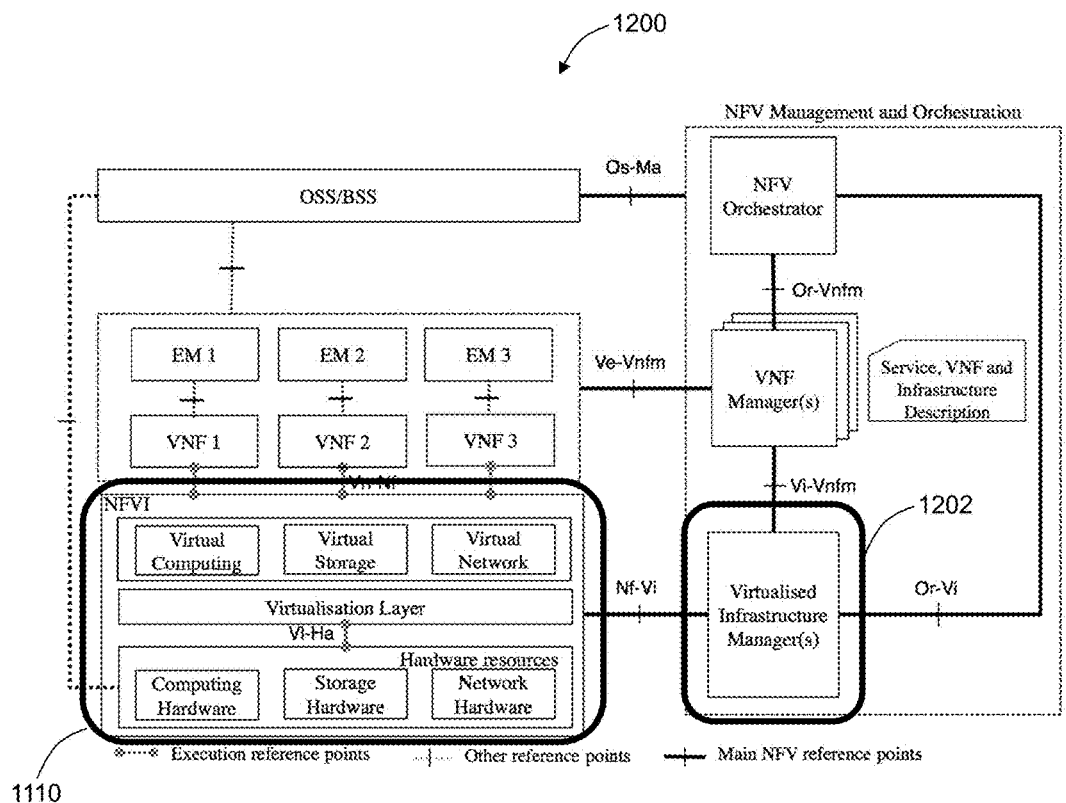
FIG. 12 illustrates a block diagram of an NFV environment with the NFV Infrastructure (NFVI) and a Virtualized Infrastructure Manager (VIM).

FIG. 12 illustrates a block diagram of an NFV environment 1200 with the NFVI 1110 and a Virtualized Infrastructure Manager (VIM) 1202. A distributed compute node in the dNFVI 1110 includes Virtualization containers (VCs) (e.g., VMs or software containers) with storage, such as, e.g., libvirt over KVM-QEMU, and connecting service chains between the VCs, such as vSwitch and/or SR-IOV. The VIM 1202 manages the NFVI 1110. OpenStack is often assumed as the VIM. The VIM 1202 allocates, upgrades, releases, and reclaims NFVI resources. For example, the VIM 1202 may participate in the various VNF deployment techniques described herein. The VIM 1202 also can manage VNF forwarding graphs, provide inventory and discovery of resources, manage software images, collect fault/Performance Monitoring (PM) data, and the like.

Figure 13:
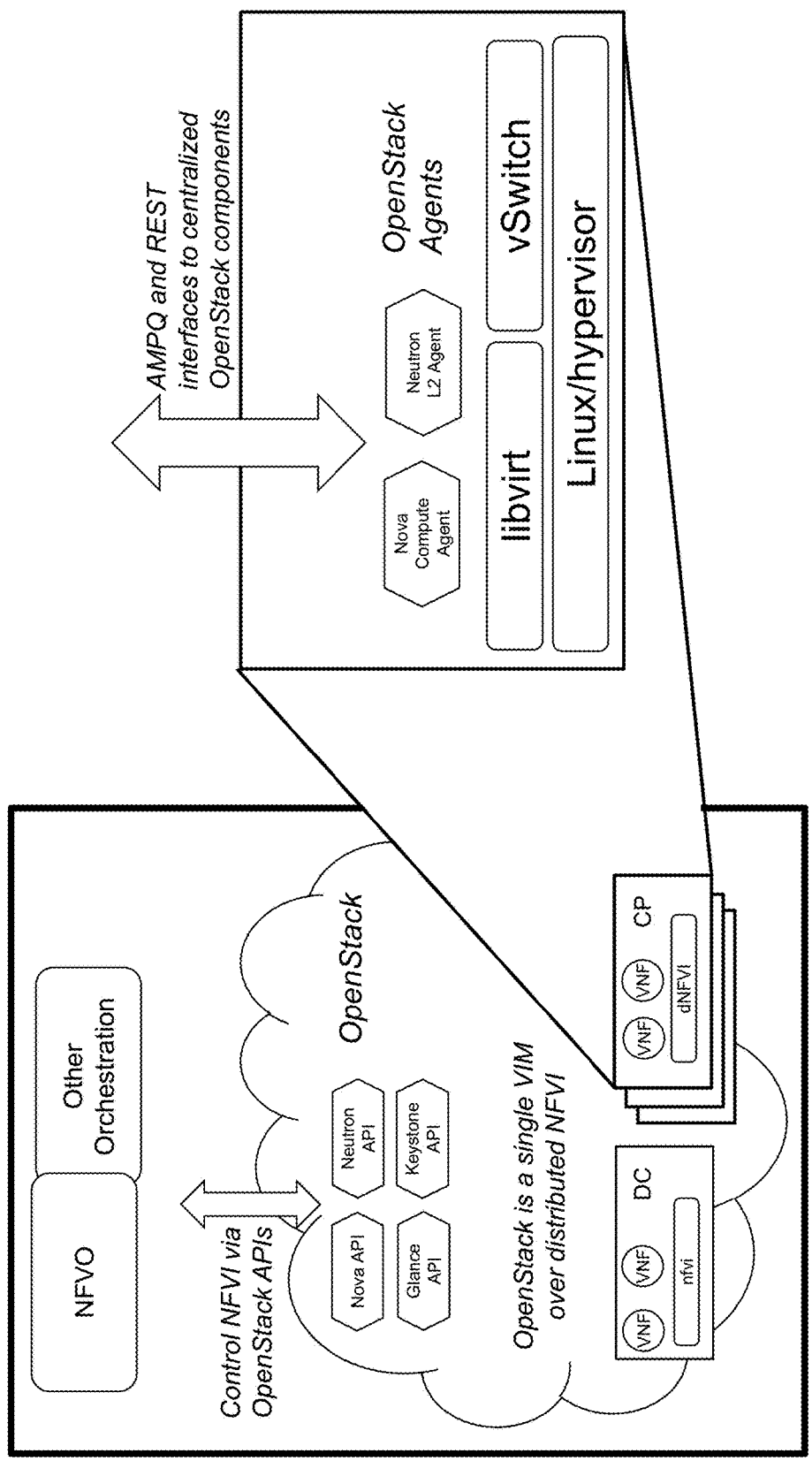
FIG. 13 illustrates a block diagram of conventional approaches to management and orchestration of Virtual Network Functions (VNFs).

FIG. 13 illustrates a block diagram of conventional approaches to management and orchestration of VNFs 1104. The example of FIG. 13 includes centralized OpenStack with reference to Neutron as the VIM 1202 for dNFVI 1110. FIG. 13 leverages the pace of innovation in OpenStack, is consistent with Open Platform for NFV (OPNFV), has de facto standard Application Programming Interfaces (APIs), and interoperates with vendor implementation. However, there are issues with the approach in FIG. 13. Specifically, there are latency/scale issues with OpenStack to the Control Plane (CP), image placement/pinning, and the like. Also, some deployments do not utilize OpenStack, such as smaller and distributed-only deployments.

Figure 14:
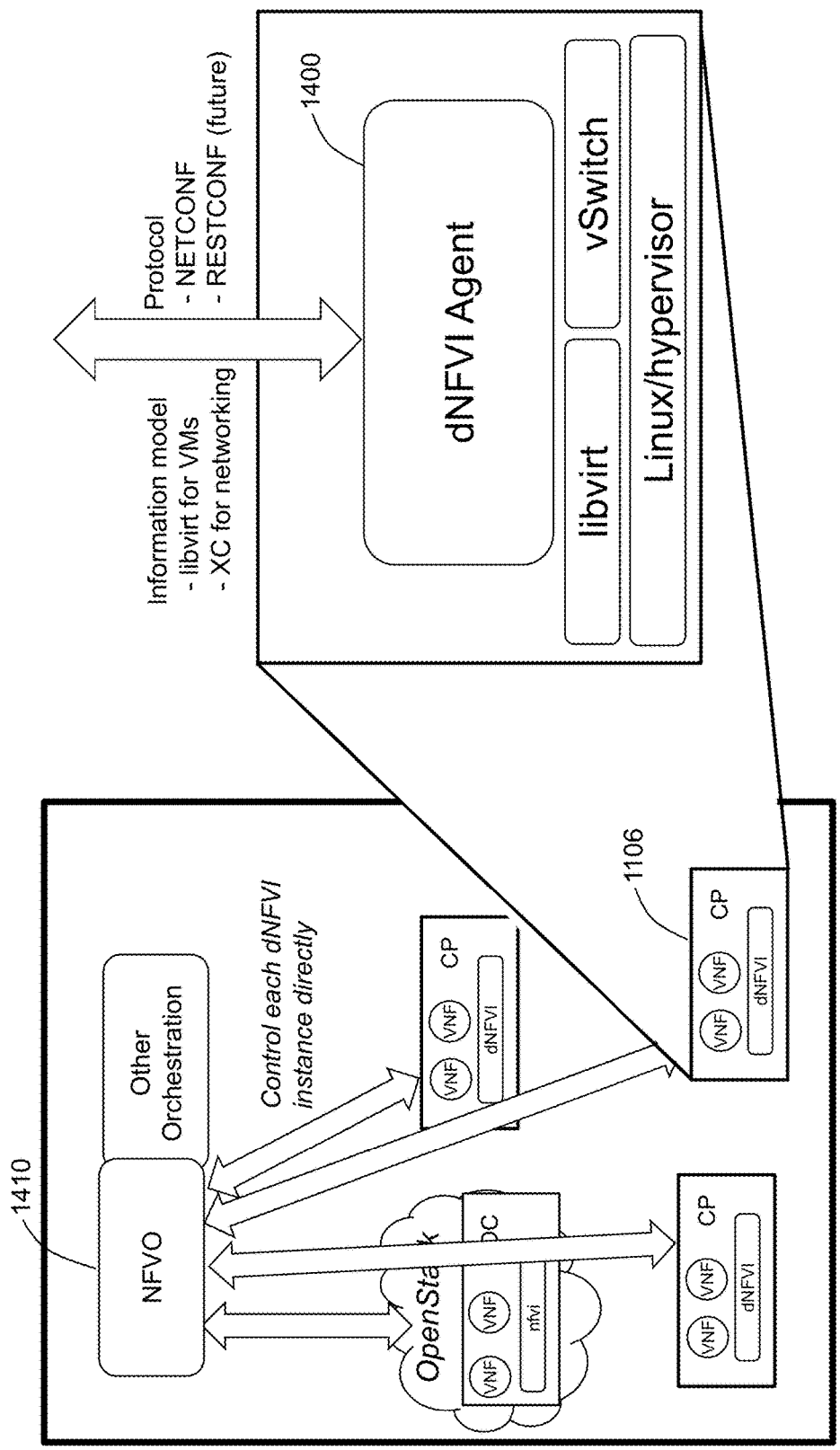
FIG. 14 illustrates a block diagram of direct management and orchestration of the VNFs with a distributed NFVI (dNFVI) agent which can be viewed as an NFV Lifecycle Manager.

FIG. 14 illustrates a block diagram of direct management and orchestration of the VNFs 1104 with a dNFVI agent 1400 which can be viewed as an NFV Lifecycle Manager. The dNFVI agent 1400 operates at the customer premises 1106. The dNFVI agent 1400 can include an information model for full management of remote customer premises equipment, such as libvirt for VMs and cross connects (XC) for networking, and can operate various protocols such as NETCONF, RESTCONF, etc. The dNFVI 1110 needs the dNFVI agent 1400 for an NFV Lifecycle Manager to allow direct orchestration from orchestrators 1410.

Figure 15:
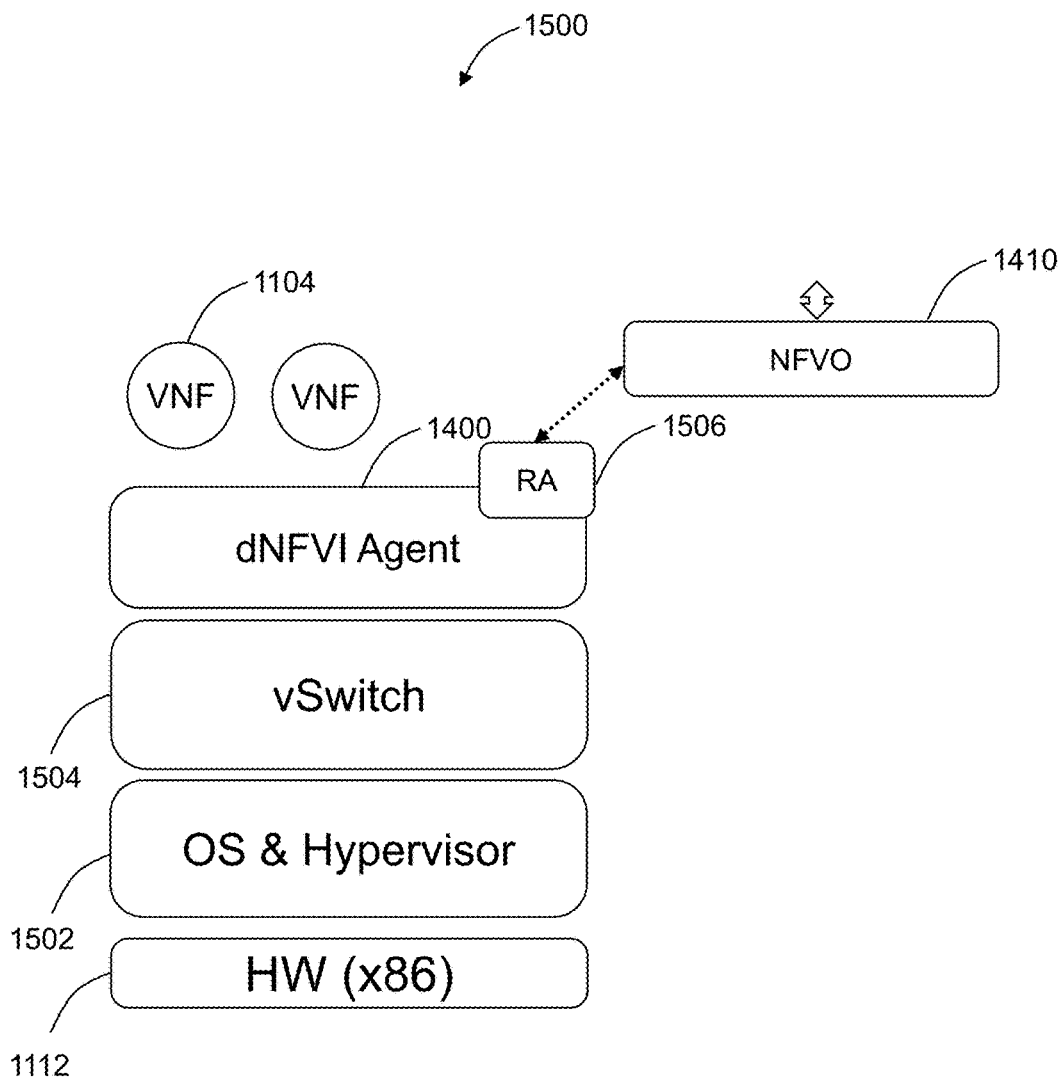
FIG. 15 illustrates a block diagram of a stack showing the dNFVI agent at the customer premises in the dNFVI.

FIG. 15 illustrates a block diagram of a stack 1500 showing the dNFVI agent 1400 at the customer premises 1106 in the dNFVI 1110. The stack 1500 is a software stack for hosting the VNFs 1104 on a distributed virtual Customer Premises Equipment (vCPE). The stack 1500 includes the hardware 1112, an Operating System (OS) and Hypervisor 1502 on top of the hardware 1112, a virtual switch (vSwitch) 1504 on top of the OS and Hypervisor 1502, the dNFVI agent 1400 on top of the vSwitch 1504, and one or more VNFs 1104 on the top. The vSwitch 1504 provides Service function chaining with advanced Ethernet and Operations, Administration, and Maintenance (OAM) support. The dNFVI agent 1400 is configured to deploy, start, stop, and/or monitor the VNFs 1104 at the vCPE. Again, the deployment can be based on all of the distribution techniques described herein.

The orchestrators 1410 can communicate to the dNFVI agent 1400 via a remote agent 1506. The dNFVI agent 1400 provides an API to orchestrate virtualization to the node (vCPE). For example, the dNFVI agent 1400 can create and perform operations on the vCPE; manage images, start/stop/monitor VNFs 1104, chain the VNFs 1104, etc.

The vSwitch 1504 is a virtual switch VNF 1104 capable of bridging and cross-connect functionality. The vSwitch 1504 can provide separation of Virtual Local Area Network (VLAN) Identifiers (VIF), allowing for endless LAN connectivity solutions (VIDx, VIDy, VIDz, all bridging natively), Class of Service (COS) mapping, Metering/Queuing, Native Layer 2 (L2) Media Access Control (MAC) learning/aging per Virtual Switch (VS)/Forwarding Identifier (FID), Ingress/Egress statistics per Flow Point, etc.

The dNFVI agent 1400 exposes the libvirt information model for VNF operations and vSwitch information model for Service Forwarding Functions (SFF). There is a NETCONF/YANG interface for all dNFVI agent 1400 functions, including Create, Read, Update, Delete, List (CRUDL); Event Notification of VNFs and Service Function Chains. The dNFVI agent 1400 can include a Command Line Interface (CLI) for all dNFVI Agent functions, including Create, Read, Update, Delete, List (CRUDL); and Event Notification of VNFs and Service Function Chains. Lab use. The dNFVI agent 1400 can support VMs or software containers.

For VNF management, the dNFVI agent 1400 can create/delete a Virtualization Container and start the VNF application referenced as the image. The dNFVI agent 1400 can specify Virtualization Container Type (e.g., KVM VM or LXC Container); VNF Name & Local Image Name; vCPU, CPU Set with CPU Pinning and Placement; Memory allocation (both max memory and current memory); Virtual disk devices, Virtual network interfaces, including PCI Passthrough, SR-IOV; Console/display/video configuration and password for remote access; and the like.

The dNFVI agent 1400 can create/delete via Extensible Markup Language (XML). The dNFVI agent 1400 can perform a Get VNF function to retrieve information (configuration, operational, performance monitoring) data about a VNF. The dNFVI agent 1400 can return a list of VNF's and a subset of their attributes (unique ID, name, state). Also, the dNFVI agent 1400 can change the libvirt lifecycle state of the VNF, such as: start: start a VNF (move a domain from the defined state to the running state); shutdown: shut down a VNF (move a domain from the running state to the defined state); resume: resume execution of a paused VNF (move a domain from the paused state to the running state); and suspend: pause execution of a VNF (move a domain from the running state to the paused state).

The dNFVI agent 1400 can provide service chaining such as Create/Delete a VLAN XC or Update/Modify a VLAN XC. For Create/Delete, the dNFVI agent 1400 can create a VLAN cross-connect as a component of simplified VNF service chain or VNF forwarding graph, such as interconnect VMs (virtual-to-virtual) and connect VMs to physical NICs (physical-virtual), classify on VID, support VLAN push-pop-swap capabilities, etc., and delete a VLAN cross-connect as a component of simplified VNF service chain or VNF forwarding graph. For Update/Modify, the dNFVI agent 1400 can modify endpoints, VLAN IDs with minimal impact to the traffic flow. Virtual Interfaces in the virtualization container should not need to be deleted and recreated.

The dNFVI agent 1400 can provide VNF image and configuration file management. In an exemplary embodiment, the dNFVI agent 1400 can operate with the deployment systems and methods described herein. The dNFVI agent 1400 can download file from a Uniform Resource Locator (URL) to a the local file system on the dNFVI 1110, upload a file from the dNVFI local file system to another host (URI), etc. Files include distributed herein can include VNF image files, XML configuration files, Snapshot files, other configuration files (e.g. cloud-init files). The dNFVI agent 1400 can list, move, copy, or delete a file in the local file system of the dNVFI 1110. Further, the dNFVI agent 1400 can get static and dynamic information about the host hardware 1112 and hypervisor 1502. For example, the min libvirt detail can allow an orchestration system to understand if it can place a VNF at this location and the resource utilization and whether it can scale up (or should scale down) VNFs.

The dNFVI agent 1400 can include monitoring of events. For example, the dNFVI agent 1400 can perform VNF health monitoring and recovery such as monitoring the VNF for errors and re-create or restart. The dNFVI agent 1400 can perform asynchronous event generation to create asynchronous notifications for various conditions such as VNF crash, VNF state changes, device errors, device add/remove, etc. The dNFVI agent 1400 can perform host performance monitoring to enable monitoring of key host statistics (retrievable via a NETCONF GET). The key host statistics can include CPU peak utilization, CPU utilization, RAM peak utilization, RAM usage averaged over 15 minute intervals, Disk usage peak utilization, Disk usage averaged over 15 minute intervals, and the like. The dNFVI agent 1400 can include VNF Performance Monitoring such as key virtualization container statistics (retrievable via a NETCONF GET). The VNF Performance Monitoring can include VM CPU peak utilization, VM CPU utilization, VM RAM peak utilization, VM RAM usage averaged over 15 minute intervals, VM Disk usage peak utilization, VM Disk usage averaged over 15 minute intervals, and the like.

Figure 16:
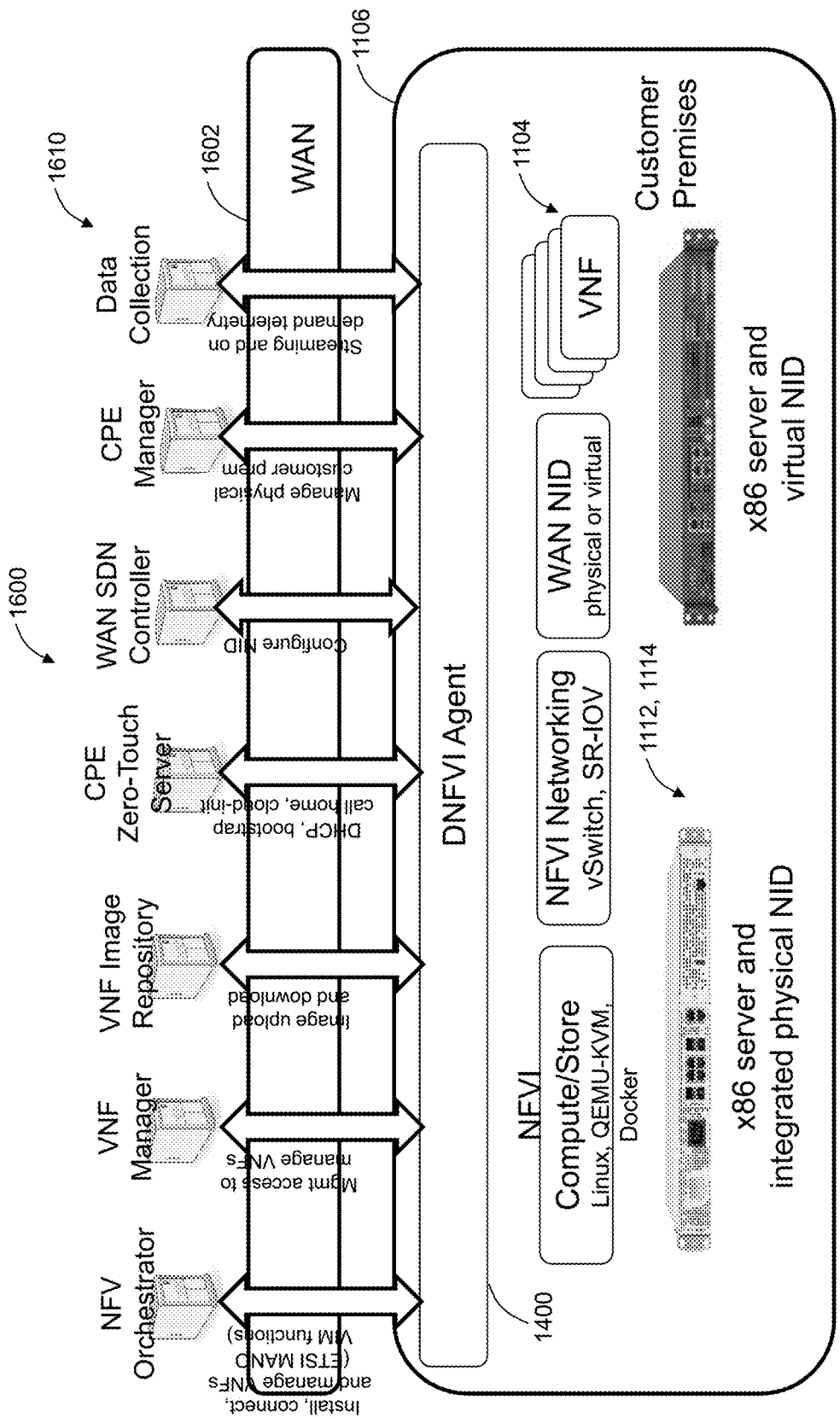
FIG. 16 illustrates a diagram of an operating environment for the dNFVI agent at a customer premises with various VNFs.

FIG. 16 is a diagram of an operating environment 1600 for the dNFVI agent 1400 at a customer premises 1106 with various VNFs 1104 operating on hardware 1112 and a NID 1114. The dNFVI agent 1400 can communicate via a Wide Area Network (WAN) 1602 to various devices 1610 for various functions. The dNFVI agent 1400 can communicate with an NFV orchestrator to install, connect, and manage VNFs (such as based on the ETSI MANO VIM functions). The dNFVI agent 1400 can communicate to a VNF manager for management access to manage the VNFs.

The dNFVI agent 1400 can communicate to a VNF image repository, such as the library 302, for image upload and download. The dNFVI agent 1400 can communicate to a CPE zero-touch server for Dynamic Host Configuration Protocol (DHCP), bootstrap call home, cloud-initialization, etc. The dNFVI agent 1400 can communicate to a WAN SDN controller for configuration such as to configure the NID. The dNFVI agent 1400 can communicate to a CPE manager to manage the physical customer premises. The dNFVI agent 1400 can communicate to a data collection entity for streaming and on demand telemetry. Note, the management and orchestration functions may be combined or separate for any of the various devices 1610.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences, and/or algorithms described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an implementation of the invention can include a computer readable media embodying a method for providing virtual network functions to an enterprise. Accordingly, the invention is not limited to illustrated examples and any means for performing the functionality described herein are included in implementations of the invention.

While the foregoing disclosure shows illustrative implementations of the invention, it should be noted that various changes and modifications could be made herein without departing from the scope of the invention as defined by the appended claims. The functions, steps, and/or actions of the method claims in accordance with the implementations of the invention described herein need not be performed in any particular order. Furthermore, although elements of the invention may be described or claimed in the singular, the plural is contemplated unless limitation to the singular is explicitly stated.

What is claimed is:

1. A method for deployment by a wide area service provider of one or more virtual network functions via a wide area network, the method comprising:
   responsive to a request for one or more virtual network functions at a computing device deployed at a service location with a provisioned network path in the wide area network to an end point location, reconfiguring the provisioned network path to a temporary network path which connects to a library located separate from the end point location;
   receiving the one or more virtual network functions at the computing device over the temporary network path;
   activating the one or more virtual network functions in the wide area network; and reconfiguring the temporary network path back to the provisioned network path and connecting the one or more virtual network functions thereto.

2. The method of claim 1, wherein the one or more virtual network functions are implemented as one or more virtual machines.

3. The method of claim 1, wherein the one or more virtual network functions are implemented as one or more software containers.

4. The method of claim 1, wherein the library contains a plurality of virtual network functions comprising the one or more virtual network functions.

5. The method of claim 1, wherein activating comprises booting and configuring one or more virtual machines or software containers.

6. The method of claim 1, wherein the library comprises one or more network-connected storage devices located remote from the service location.

7. The method of claim 1, wherein the computing device comprises a hypervisor and a plurality of virtual machines thereon.

8. The method of claim 1, wherein the one or more virtual network functions are operated in a distributed network functions virtualization infrastructure at a customer premises, and the method further comprising:
providing a distributed agent to the customer premises for management and orchestration of the one or more virtual network functions.

9. The method of claim 8, wherein the distributed agent is configured to perform any of management of the one or more virtual network functions, service chaining of the one or more virtual network functions, image and file management for the one or more virtual network functions, and monitoring of events related to the one or more virtual network functions at the customer premises.

10. A library in a wide area network for deployment of one or more virtual network functions, the library comprising:
one or more network-connected storage devices containing a plurality of virtual network functions; and
one or more connections to the wide area network from the one or more network-connected storage devices,
wherein, responsive to a request for one or more virtual network functions from a computing device deployed at a service location with a provisioned network path in the wide area network to an end point location, the provisioned network path is reconfigured to a temporary network path which connects to the library via the one or more connections, wherein the library is located separate from the end point location;
wherein the one or more network-connected storage devices are configured to transmit the one or more virtual network functions to the computing device over the temporary network path, cause activation of the one or more virtual network functions in the wide area network, and cause the temporary network path to be reconfigured back to the provisioned network path for connecting the one or more virtual network functions thereto.

11. The library of claim 10, wherein the one or more virtual network functions are implemented as one or more virtual machines.

12. The library of claim 10, wherein the one or more virtual network functions are implemented as one or more software containers.

13. The library of claim 10, wherein the activation comprises booting and configuring one or more virtual machines or software containers.

14. The library of claim 10, wherein the one or more network-connected storage devices are located remote from the service location.

15. The library of claim 10, wherein the computing device comprises a hypervisor and a plurality of virtual machines thereon.

16. The library of claim 10, wherein the one or more virtual network functions are operated in a distributed network functions virtualization infrastructure at a customer premises, and wherein a distributed agent is provided to the customer premises for management and orchestration of the one or more virtual network functions.

17. The library of claim 16, wherein the distributed agent is configured to perform any of management of the one or more virtual network functions, service chaining of the one or more virtual network functions, image and file management for the one or more virtual network functions, and monitoring of events related to the one or more virtual network functions at the customer premises.

18. A wide area network for deployment of one or more virtual network functions, the wide area network comprising:
one or more service locations each with a provisioned network path in the wide area network to an end point location; and
a library connected to the wide area network, wherein the library comprises a plurality of virtual network functions,
wherein, responsive to a request for one or more virtual network functions from a computing device deployed at the one or more service locations, the provisioned network path is reconfigured to a temporary network path which connects to the library, wherein the library is located separate from the end point location;
wherein the library is configured to transmit the one or more virtual network functions to the computing device over the temporary network path, cause activation of the one or more virtual network functions in the wide area network, and cause the temporary network path to be reconfigured back to the provisioned network path for connecting the one or more virtual network functions thereto.

19. The wide area network of claim 18, wherein the one or more virtual network functions are implemented as one or more virtual machines.

20. The wide area network of claim 18, wherein the one or more virtual network functions are implemented as one or more software containers.

* * * * *